May 11, 1965 C. S. TAYLOR 3,182,405
APPARATUS FOR ADJUSTING STEERING AND WHEEL ALIGNMENT
Filed Nov. 1, 1961 4 Sheets-Sheet 1
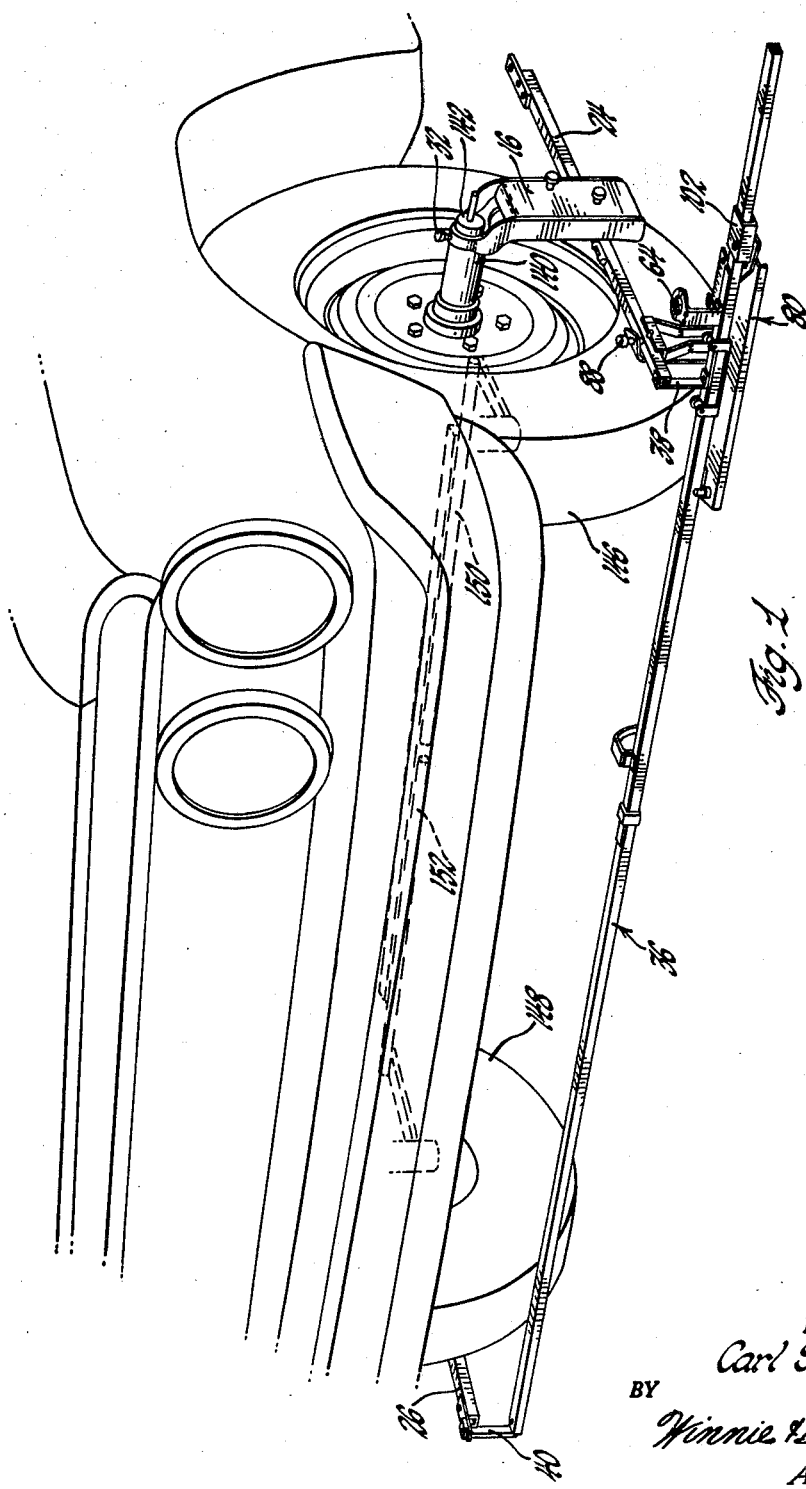
INVENTOR.
Carl S. Taylor
BY
Winnie & Barnard
ATTORNEYS

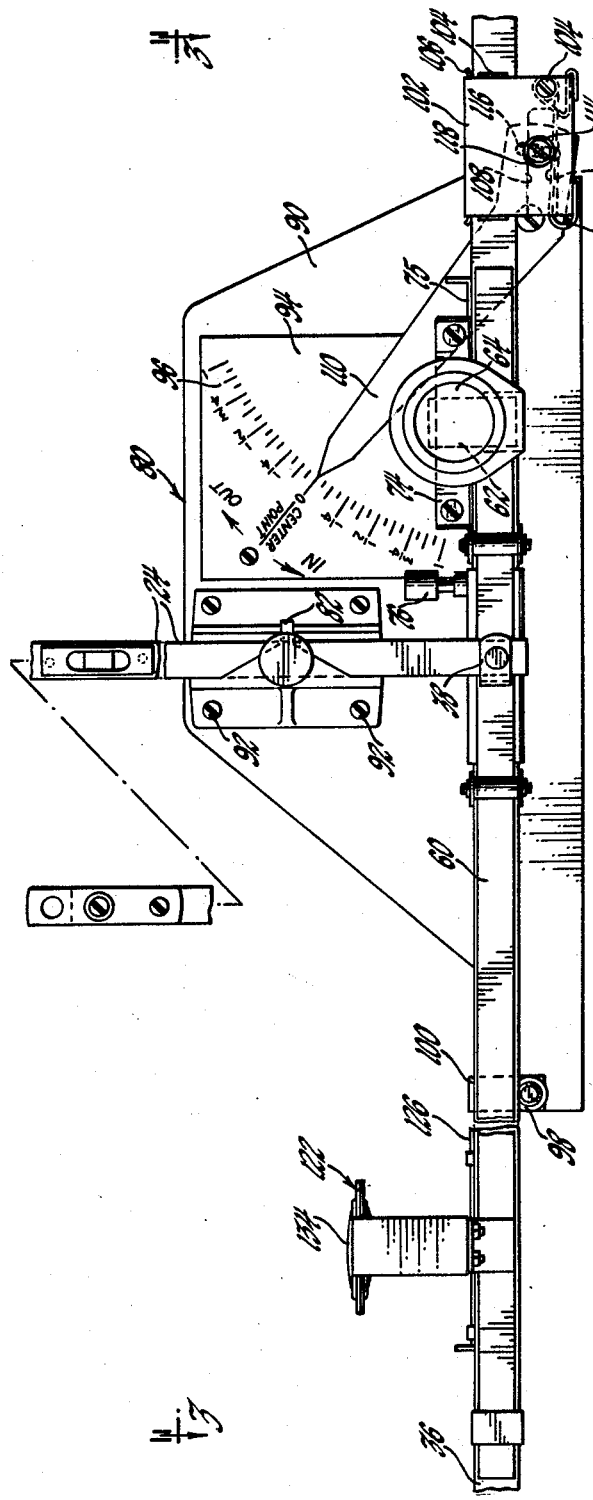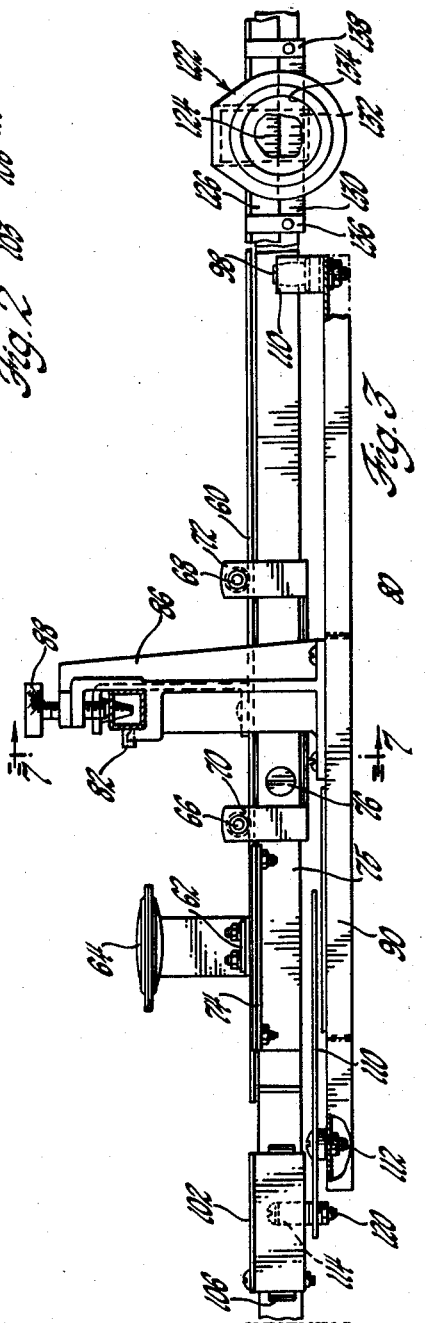

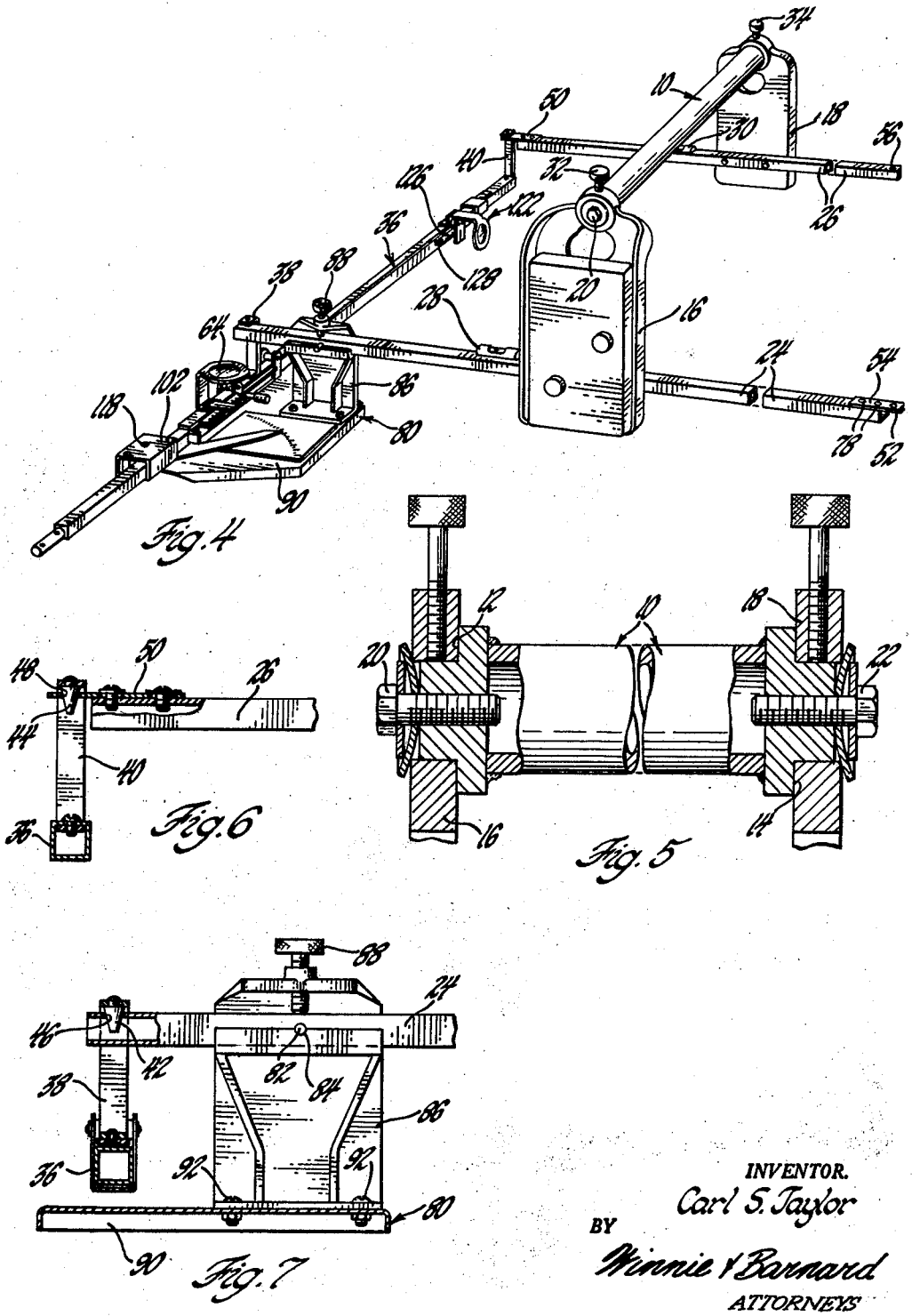

May 11, 1965 C. S. TAYLOR 3,182,405
APPARATUS FOR ADJUSTING STEERING AND WHEEL ALIGNMENT
Filed Nov. 1, 1961 4 Sheets-Sheet 4
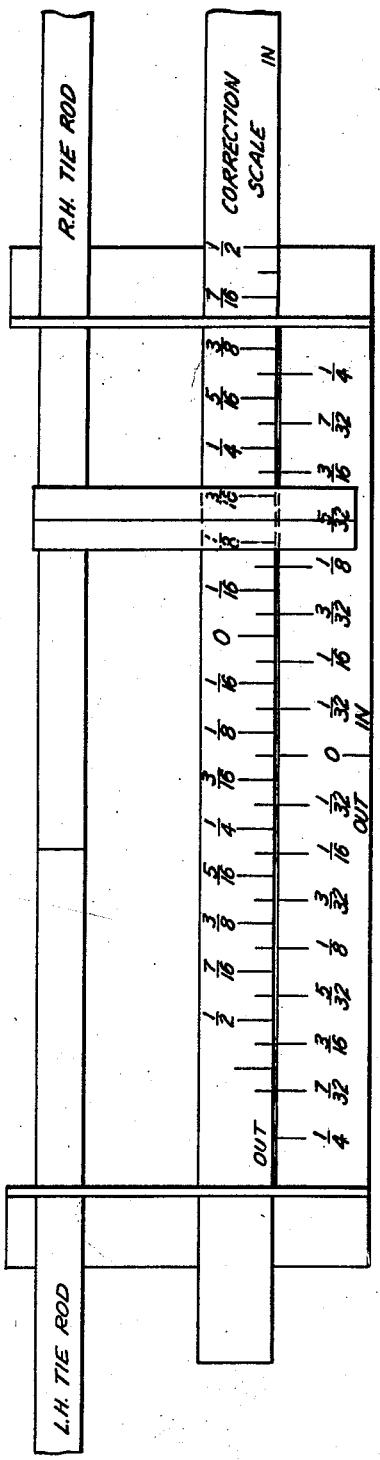
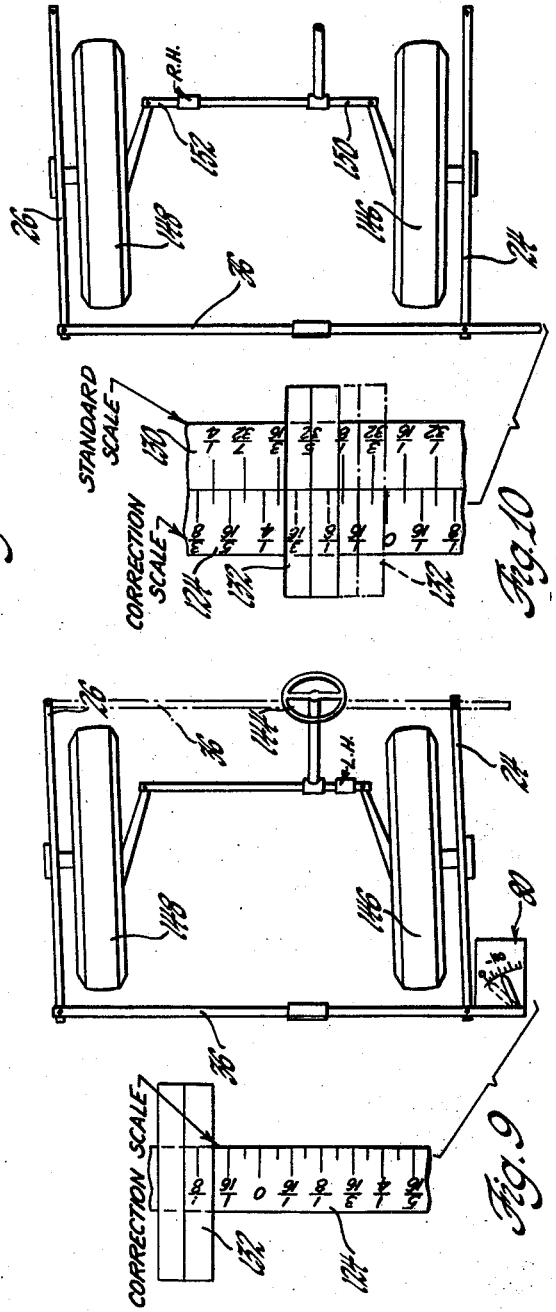
INVENTOR.
Carl S. Taylor
BY
Winnie & Barnard
ATTORNEYS United States Patent Office 3,182,405
Patented May 11, 1965

3,182,405
APPARATUS FOR ADJUSTING STEERING AND
WHEEL ALIGNMENT
Carl S. Taylor, Springfield, Ill., assignor to Dura Corporation, Oak Park, Mich., a corporation of Michigan
Filed Nov. 1, 1961, Ser. No. 149,326
6 Claims. (Cl. 33—203.2)

This invention relates to a method and apparatus for providing the proper alignment of the front or steerable wheels of a vehicle. More specifically, the present invention relates to a simplified but highly accurate device for adjusting the angular relationship between the steerable wheels and the longitudinal axis of the vehicle. This type of adjustment of steerable wheels is frequently referred to as a "toe" adjustment.

Car manufacturers normally build their steering mechanisms so that the worm and gear sector or other steering mechanism has a slight amount of clearance or looseness when the steering wheel crossbar or spoke is at right angles to the center line of the car and the wheels are straight ahead with the divided tie rods equal or in proper adjustment. This neutral or straight ahead condition is called the "high point" or "center point" setting.

It can be seen that any deviation from this position will give an improper turning radius causing increased tire wear on turns and possibly additional looseness in the steering wheel system when the vehicle is traveling straight ahead.

When a steering wheel is set on the "high point" with the front wheels straight ahead, steering gear looseness and wheel vibration are essentially eliminated. This assumes with a double tie rod steering arrangement that such rods are adjusted to equal lengths. Any variation from this position will give improper turning radius and increased tire wear on turns.

With the present invention, when a change in the amount of toe or angular adjustment of the steerable wheels is necessary, a correction scale is attached to a toe gauge and will show how much the tie rods are to be adjusted without the necessity of the mechanic either calculating or visually "guessing" the amount of change required. Also, the present invention includes a scale which will indicate to the mechanic as he makes the adjustment just what amount of toe change is occurring and when he has reached the specified amount of toe.

Heretofore, to arrive at the "center point" on the steering wheel, the mechanic has sighted down the inside of the front wheels to the rear wheels and thereafter visually adjusted the tie rods to set the front wheels at equal angular relationship with the rear wheels. Obviously, due to differences in tread between front and rear wheels and, further, on vehicles utilizing front and rear wheels that do not track, this method is rather inaccurate.

The present apparatus is capable of being accurately calibrated to insure the components are accurately adjusted before the apparatus is mounted on a vehicle.

Basically, the present apparatus includes a lever system which includes a pair of side or parallel bar members which are suitably connected to the wheel axles so as to be parallel with each wheel. The parallel arms are also adjustable so as to be level horizontally. The parallel side arms are interconnected by a horizontal gauge bar through gauges and scales which both indicate the angular relationship of the wheels and also permit said wheels to be visually adjusted to set the wheels to a predetermined angle relative to the center or longitudinal axis of the vehicle without the necessity for any calculation by the user.

Whereas previously it has been necessary for a mechanic to make a toe adjustment on the steerable vehicle wheels by a process of trial and error, the present method and apparatus enable such adjustments to be accurately made by simply following a sequence of steps which inevitably give an accurate adjustment of the wheel without repetition of steps.

The details as well as other objects and advantages of the present invention will be apparent from a perusal of the description which follows.

In the drawings:

FIGURE 1 shows the subject apparatus mounted on the steerable wheels of a vehicle;

FIGURE 2 is a plan view of the center point gauge and gauge bar;

FIGURE 3 is an elevational view of the gauge bar as viewed by a person adjusting the tie rods;

FIGURE 4 shows the apparatus mounted on a test and adjusting stand;

FIGURE 5 shows part of parallel side bar adjusting mechanism;

FIGURE 6 shows means for mounting gauge bar on side bars;

FIGURE 7 shows center point gauge mounting structure;

FIGURES 8–10 are diagrammatic showings of adjusting gauges as used to make toe adjustments.

The subject apparatus must be correctly calibrated and adjusted before it is put into service, therefore, the apparatus is adapted to be mounted on a checking fixture as shown in FIGURES 4 and 5. A rigid supporting bar 10 is clamped in a generally horizontal position within a fixture or vise not shown. Bar 10 has two parallel end faces 12 and 14 to which brackets 16 and 18 are secured through bolts 20 and 22.

Parallel side bars 24 and 26 are respectively connected to brackets 16 and 18 and are parallel to or generally in the same plane with the brackets. Side bars 24 and 26 include spirit levels 28 and 30 which permit the bars to be moved to level or horizontal positions and locked therein through set screws 32 and 34.

A gauge bar 36 having upstanding brackets or extensions 38 and 40 mounted thereon is adapted to be supported upon parallel side bars 24 and 26 through cone members 42 and 44 projecting downwardly from the upper ends of the brackets. Bracket cone members 42 and 44 respectively cooperate with holes 46 and 48 respectively in the front end of side bar 24 and in an adjustable link 50 mounted on the front end of side bar 26. The cone members also support gauge bar 36 at the rear end of side bars 24 and 26 by engaging hole 52 in an adjustable link 54 and hole 56 in side bar 26.

For purposes which will be subsequently more apparent, adjustable links 50 and 54 are provided to permit small adjustments longitudinally of the lengths of side bars 24 and 26. Side bars 24 and 26 are of the same length and are mounted on their respective brackets 16 and 18 so that when gauge bar 36 is mounted at the front of the side bars, FIGURE 1, it is intended to be parallel to the position of the gauge bar when it is mounted at the rear of the side bars. However, normal manufacturing tolerances as well as wear of the apparatus make it necessary to provide adjusting means, links 50 and 54, to insure such parallelism. Before describing how adjustments are made to links 50 and 54, other elements of the apparatus must be described.

Bracket 38 is mounted on a slide 60 which also carries a cross hairline indicator 62 and a magnifying lens 64. Slide 60 is slidably mounted on gauge bar 36 through roller members 66 and 68 mounted on brackets 70 and 72 fixed to the gauge bar.

A scale 74 is movably supported upon gauge bar 36 through a strip member 75 and projects horizontally from the gauge bar and is disposed immediately beneath hairline indicator 62. In calibrating the apparatus, sliding scale 74 is moved to place the "O" or zero line under the hairline and clamped to gauge bar 36 by a thumb screw 76.

Gauge bar 36 is then removed from the front ends of parallel bars 24 and 26 to the opposite ends thereof whereby cones 42 and 44 are placed, respectively, in holes 52 and 56. Scale 74 now shows the difference or degree of non-parallelism, between the front and rear mounting of the gauge bar, in fractions of an inch. Link 54 is then lossened and moved to take up half of this distance and clamped in place by screws 78. Gauge bar 36 is then returned to the front location on bars 24 and 26 and link 50 is then adjusted to take up the "other half" of the misalignment distance. In this way the check point holes 46–48 and 52–56 are now accurately set to insure parallelism between the "front" and "rear" positions of gauge bar 36.

A center point gauge 80, shown in detail in FIGURES 2 and 3, is next hooked over parallel side bar 24 with a bar pin 82 disposed in a locating slot 84 formed in bracket 86. Gauge 80 is then rigidly clamped to the side bar through a bracket screw 88.

A gauge base plate 90 is secured to bracket 86 through suitable screws 92. When gauge 80 is in position, base plate 90 extends beneath gauge bar 36. A dial 94 is secured to base plate 90 and includes a scale 96 having markings in inches corresponding to correction scale 124.

A barrel-shaped roller 98 is rotatably mounted on base plate 90 and is biased against gauge bar 36 by a leaf spring member 100.

Gauge 80 also includes a box shaped member 102 which slides over gauge bar 36 and is supported on the gauge bar through leaf springs 104 and 106 disposed respectively at the top and side thereof to take up clearance. Box member 102 is adapted to extend to one side, the front, of gauge bar 36 and within which a spring 103 is housed. Spring 103 is hooked at one end around box 102 and at its other end is wrapped around a box supported-stud member 104 so as to include a straight spring section 106 parallel with a slot 108 formed in the bottom of the box.

A pointer or indicator hand 110 is pivotally mounted at 112 on base plate 90. A pin or stud 114 is pivotally secured to the end of pointer 110 opposite from the pointing end thereof and enters slot 108 in box 102 and is held in biased engagement with one side of the slot by the parallel section 106 of spring 103. As best seen in FIGURE 2, pin 114 is actually mounted in an arcuate slot 116 formed in pointer 110. A hole 118 is formed in box 102 to permit a screwdriver to be inserted to engage and loosen pin supporting stud 120 for adjusting pointer 110 to a "O" setting on scale 96.

A scale device 122 is mounted on gauge bar 36 intermediate the ends thereof. Device 122 includes a correction scale 124 formed on a flat strip member 126 which terminates at one end in an upturned tab to permit adjustments in the correction scale, infra. Crosshair member 132 and lens 134 are mounted on slide member 60 and disposed at 90° to the outside scale assembly 62, 64 and 74. Inside scale assembly 130, 132, 124 and 134 makes it possible for the mechanic to make tie rod adjustments under the vehicle and read the adjustments on the correction scale 124 as it takes place.

Inside scale 130 is secured to gauge bar 36 through brackets 136 and 138 which also slidably support correction scale 124 aligned above scale 130.

The correction markings on scale 124 are 1/32 apart but are identified as 1/16 dimensions. The standard scale markings 74 and 130 are 1/32 of an inch apart and are identified as 1/32 dimensions. These scale markings 74, 124 and 130 are magnified by lenses 64 and 134 to read two to one thereby insuring accurate readings to 1/32 of an inch.

The apparatus is now calibrated and ready for use on a vehicle. The detail operation of the apparatus to achieve the proper toe and steering center point correction will now be considered.

The wheel hub caps and grease caps are removed and sleeves 140 are suitably mounted on the wheel spindle. Brackets 16 and 18 are then secured to the outer end of sleeves 140 through nuts 142. Brackets 16 and 18 are adjusted so that the side bars 24 and 26 are horizontally level according to the associated spirit levels 28 and 30. When the parallel side bars are level, clamp screws 32 and 34 are tightened. Gauge bar 36 is mounted at the rear ends of parallel side bars 24 and 26 and supported therefrom by cone members 42 and 44 respectively positioned in holes 56 and 52. Outside scale 74 is now adjusted to read "0" under the crosshair of indicator 62, lock screw 76 is then set to lock the scale in this position. The horizontal gauge bar is then moved to the front ends of parallel bars 24 and 26 and supported therefrom in the manner already described in holes 46 and 48 respectively in side bar 24 and adjustable link 50 of side bar 26. Due to the original calibration of the apparatus, holes 46 and 48 are equidistant from the respective wheel spindles.

The amount of "existing" toe is now read through the magnifying lens 64 and under the crosshair indicator 62 on the outside scale 74.

Mounting bracket 86 of centering gauge 80 is then mounted on side bar 24 which is associated with the wheel closest to the steering wheel. Centering pin 82 secured to parallel side bar 24 and slot 84 formed in mounting bracket 86 properly locate the centering gauge for accurate reading. The center point gauge 80 is then made secure by screwing down hand screw 88. Box member 102 is now slipped along gauge bar 36 until slot 108 engages pin 114 of pointer 110. Steering wheel 144, shown schematically in FIGURE 9, is then moved to its center or high point in which the steerable wheels 146 and 148 should be pointed straight ahead with the proper "toe-set" specified by each manufacturer for the particular model of automobile. Indicator 110 will now indicate on center gauge dial 96 the amount in inches wheel 146 is "in" or "out" to the center axis of the vehicle.

To make the necessary adjustment, if any, to wheel 146, correction scale 124 is moved to the amount of "existing" toe shown on the outside scale 74 under the crosshair indicator 62. This value then is directly disposed under the hairline indicator 132.

Tie rod 150 attached to wheel 146 is now lengthened or shortened until pointer 110 on the center point gauge 80 is directly over ½ the desired toe.

The next step is to establish the "desired" toe between the steerable wheels 146 and 148. This "toe-set" is specified by each manufacturer for the particular model of automobile. The "toe-set" for the particular automobile is then known and will be set as follows.

Center point gauge 80 is removed from gauge bar 36. Tie rod 152 connected to wheel 148, which is on the opposite side to steering wheel 144, is adjusted until the crosshair of indicator 132 is directly over the "desired" toe as read on the correction scale 124. The change in toe is observed on the correction scale as tie rod 152 is lengthened or shortened.

The preceding method of adjusting toe and steering center point can best be understood by using an example and referring to the illustrated scale shown in FIGURE 8 and the schematic views of FIGURES 9 and 10.

Assume that the "desired" toe for a vehicle is 1/16 of an inch "in." This means that each wheel should be turned in 1/32 of an inch to give a full or total toe-in measurement of 1/16 of an inch.

The steering wheel 144 is first set for straight ahead steering which, as previously mentioned, means having the cross-bars of the steering wheel disposed horizontally.

The straight ahead steering position orients the vehicle road wheels substantially straight forward, except for what-ever toe exists, and positions the steering gear on its center point where gear wear and looseness is at a minimum. Accordingly, in subsequent checking and adjustment all readings and adjustments are assured of greatest accuracy.

The spindle engaging brackets 16 and 18 are engaged to the respective sleeves 140 of the wheel spindles and the side bar members 24 and 26 are disposed to extend fore and aft relative to the vehicle steering road wheels 146 and 148. The spirit gauges 28 and 30 are used to level the side bars and they have previously had the adjustable links 50 and 54 set so that they would be exactly parallel and squared with each other if there were no toe between the two road wheels.

The gauge bar 36 is first placed transversely across and behind the two road wheels 146 and 148. The fixed support 40 on one end of the bar is positively engaged with the after end of the side bar 26 and the adjustable support 38 on the other end of the gauge bar 36 is positively engaged to the after end of the side bar 24.

With the gauge bar 36 extended across and behind the wheels, the scale 124 is adjusted to obtain a zero setting on the total toe reading linear gauge 122. This involves adjusting the strip 126, on which the toe measurement calibrations are provided, relative to the cross hair 132. Since the latter is on the slide 60 it is in turn part of the relatively adjustable hanging support 38.

The gauge bar 36 is now moved and placed straight across and ahead of the two wheels 146 and 148 for support on the forward ends of the side bar members 24 and 26. The hanging supports 38 and 40 are again positively engaged to the side bar members and, in the course thereof, the adjustable support 38 and its slide 60 will be repositioned on the gauge bar in accord with the total toe which exists for the two wheels.

If the support 38 is adjusted on the bar towards the fixed support 40, there will be a toe-in measurement on the scale 124 (which is adjusted with the bar 36 relative to the cross-hair 132 on the slide 60). If the adjustment is outward on the bar, then there will be a toe-out reading on the scale.

Let us assume a total toe-in measurement of 5/32 of an inch.

The next step is to mount the angle measuring gauge 80 on the side bar member 24 and find out what the true toe is for the wheel 146.

The angularity gauge 80 is fixedly located on the side bar 24 with the pin 82 received in the notch 84 (see FIGURE 7). The slide box 102, with the means for actuating the pointer 110, is received on the end of the gauge bar 36. The stud 114, on the end of the pointer, is engaged in the actuating slot 108 and the pointer swings over the scale 96 to read the toe for the one wheel 146. This is due to the gauge 80 having been pre-set to show zero toe if the bars 36 and 24 should be square with each other.

This time, let us assume the gauge 80 shows a toe-out of 1/8 (or 4/32) for wheel 146.

Mentally, or on paper, we can determine that the vehicle wheel 146 should be adjusted "in" a total of 5/32 of an inch. That is, we must adjust "in" a total of 4/32 to counter the toe-out reading of 4/32 and then we must adjust 1/32 further "in" to obtain the final setting desired for wheel 146.

Recalling that our total toe reading on the linear scale 122 was 5/32 "in," the 4/32 of an inch toe-out reading for wheel 146 means that wheel 148 must have a toe-in of 9/32 of an inch. This would require an adjustment of 8/32 "out" to leave the 1/32 of an inch toe-in desired for wheel 148.

Fortunately, this mental arithmetic is not necessary. All of the information we need is obtained by the scales 80 and 122. More important, in applying part of what we know we will automatically get the answer to whatever else we need to know.

After we get the reading of scale 80, we make the toe correction required to wheel 146. In the course of doing so we leave the gauge bar 36 set up on the front ends of the side bars 24 and 26. Accordingly, when we adjust wheel 146 "in" for the 5/32 of an inch required, we will cause the bar 36 and scale 124 to again move relative to the adjustable support 38. To our original 5/32 of an inch toe-in we add another 5/32 of an inch and so have a reading of 10/32 "in".

We want to end up with a total toe-in of 1/16 of an inch, or 2/32, so we adjust the wheel 148 until the reading on the scale 124 is just exactly that. We will have adjusted the wheel 148 "in" a total of 8/32 of an inch. Remembering that we have already set wheel 146 for 1/32 of an inch toe-in, we will have wheel 148 set for a like amount and our correct total toe setting as well.

To check the accuracy of the 1/16 inch toe-in setting, outside scale 74 is set under the crosshair of indicator 62 to read 1/16 "in" and gauge bar 36 then moved to the rear of parallel side bars 24–26 in which position a "0" reading should be indicated.

The wheel alignment checking and alignment adjustment taught by this invention is simple. Once the wheel alignment checking apparatus has been properly adjusted so that the side bars extend fore and aft of the supporting wheel spindles an equal amount, and the angularity gauge 90 set at zero, a comparison of the distance between the ends of the side bars, at the fore and aft disposed ends, gives total toe. Thereafter, only one wheel need be set relative to the center line of the vehicle and the other wheel can be set by simple adjustment for the desired total toe.

The pre-adjustment of the side bars, on their respective means of engagement with the wheel spindles, so that they are "square" on the calibration bar and their respective ends extend fore and aft an equal distance, assures a dependable means of measuring angularity between one of the side bar arms and the gauge bar in lineal terms of toe-in or toe-out. Further, it enables an accurate comparison of the distance between the opposite ends of the side bars since respective ends will travel in equal arcs and maintain a comparable relationship. If one bar extends fore or aft more than the other it would close or widen the distance therebetween and even when the bars were parallel a difference in the two readings would exist.

While this aspect constitutes no part of the present invention, it is to be noted that side bar supporting brackets 16 and 18 also include means for adjusting caster, camber and king pin inclination with respect to each of the wheels as shown in Patent 2,831,264 to Weaver. For a complete alignment correction, these three elements must be corrected before the toe and steering center point correction is made. It is assumed that caster, camber and king pin adjustments have been made prior to the time the subject device is utilized to adjust the horizontal angularity of the steerable wheels.

It is apparent that various structural modifications may be made within the intended scope of the present invention as set forth in the hereinafter appended claims.

I claim:
1. Vehicle wheel alignment apparatus, comprising:
   a gauge bar member having means of support provided near its ends and having one of the support means thereof adjustable lengthwise on the bar,
   means for engaging the spindles of a pair of vehicle steering road wheels and including members which extend forward and rearward of the wheels for receiving the support means of the bar in engagement therewith and for supporting the bar extended first across and behind the wheels and then across and in front of the wheels, a linear scale provided on the bar and cooperatively disposed relative to the adjustable support means for indicating the relative location of the support on the bar, the difference in the relative location of the adjustable support on the bar when disposed behind and ahead of the wheels being a measure of the total toe of the vehicle wheels, means received in operative engagement with the bar and one of the bar supporting members for indicating the angular relation therebetween as a measure of the toe of one of the wheels, and means for positively engaging the support means of the bar to the bar supporting members for adjustment of the adjustable support means relative to the linear scale, in the course of toe corrective adjustment of the one wheel measured, for indicating the remaining toe between the wheels as a measure of the toe correction required of the other of said wheels.

2. The vehicle wheel alignment apparatus of claim 1, said linear scale being separately adjustable on the bar and relative to the adjustable support means for setting the scale to a zero reading when the bar is disposed across and behind the wheels, and said scale being visibly disposed between the ends of the bar and for ease of reading in the course of adjusting both of said wheels.

3. The wheel alignment apparatus of claim 1; the means provided on the bar supporting members for positively engaging the support means of the bar thereto including connecting links adjustable at least at opposite ends of the bar supporting member, said adjustable links enabling pre-use setting of the bar supporting members for equidistant fore and aft extension and non-toe relative parallel spaced alignment on their respective spindle engaging means.

4. The wheel alignment apparatus of claim 1, the means for indicating the angular relation between the bar and one of the bar supporting members, as a measure of the toe of one of the wheels, including a scale having angular calibrations and means for removable attachment thereof to and relatively located on said one bar supporting member, a pointer pivotal relative to the scale and having means provided beyond the pivotal end thereof for operative engagement with the bar as received and supported on the forward end of said one bar supporting member.

5. The wheel alignment apparatus of claim 4, the means of operative engagement between the pointer and the bar including a cam slot member provided on said bar and a member receptive in engagement therewith on said pointer, and the cam slot receptive member being relatively positionable on the pointer for the pre-use calibrated setting of said pointer relative to said scale.

6. Vehicle wheel alignment apparatus, comprising; a straight bar of extended length having hanging supports therefor provided near its opposite ends, one of said hanging supports being relatively freely adjustable on the bar for the relocation thereof at different locations along the length of the bar, the other of said hanging supports being fixed to said bar, means for engaging the spindles of a pair of vehicle steering road wheels and for simulating the individual fore and aft alignment disposition of the wheels, said individual wheel alignment simulating means including side bar members having means provided at the ends thereof for receiving the hanging supports of the extended bar in positive engagement therewith in the support of the extended bar transversely across and behind the vehicle wheels and transversely across and ahead of the wheels, a lineal strip provided on the extended bar and adjustable lengthwise thereof and relative to the adjustable hanging support of said bar, a linear scale calibrated to measure toe and provided on the strip and including a zero setting for location relative to said adjustable support during the support of the extended bar across and behind said vehicle wheels, said extended bar and said linear scale being movable together relative to said adjustable support upon the relocation of said extended bar on said side bar members from across and behind to across and ahead of said wheels for indicating on said scale the total toe of said wheels, an angle measuring gauge removably received and supported on one of the side bar members and operatively disposed relative to the extended bar, said angle gauge including a scale fixedly provided relative to the one side bar member and having a pointer pivotally provided thereon and operatively engaged by the extended bar as received and supported on the forward end of the one side bar member, a cam slot provided in the pivotally mounted end of said pointer and a cam slot operator provided adjustably on the extended bar member and operatively engaged in the slot, said angle gauge indicating the toe of one of said vehicle wheels, and said linear scale indicating the toe correction required of the other of said vehicle wheels following the adjustment of said one wheel in accord with said angle gauge and the simultaneous adjustment of the extended bar and the linear scale therewith relative to the adjustable support.

References Cited by the Examiner
UNITED STATES PATENTS

| | | | |
|---|---|---|---|
| 1,027,418 | 5/12 | Heide | 33—179.51 X |
| 2,160,226 | 5/39 | Phillips | 33—203.18 X |
| 2,522,916 | 9/50 | Zeigler | 33—203.2 |
| 2,532,593 | 12/50 | Bender et al. | 33—203.2 |
| 2,556,227 | 6/51 | Shaw | 33—203.17 |
| 2,689,403 | 9/54 | Wilkerson | 33—46.2 |
| 2,732,626 | 1/56 | Knight | 33—203.18 X |
| 2,737,728 | 3/56 | Taber | 33—203.2 |
| 2,831,264 | 4/58 | Weaver | 33—203.18 |
| 2,972,189 | 2/61 | Holub | 33—203.2 X |

ISAAC LISANN, *Primary Examiner.*

L. R. PRINCE, *Examiner.*